(12) United States Patent
Ben-Yaakov et al.

(10) Patent No.: US 8,259,476 B2
(45) Date of Patent: Sep. 4, 2012

(54) SELF-ADJUSTING SWITCHED-CAPACITOR CONVERTER WITH MULTIPLE TARGET VOLTAGES AND TARGET VOLTAGE RATIOS

(76) Inventors: Shmuel Ben-Yaakov, Beer-Sheva (IL); Meir Shashoua, Tel Aviv (IL)

( * ) Notice: Subject to any disclaimer, the term of this patent is extended or adjusted under 35 U.S.C. 154(b) by 562 days.

(21) Appl. No.: 12/511,158

(22) Filed: Jul. 29, 2009

(65) Prior Publication Data

US 2010/0026264 A1 Feb. 4, 2010

Related U.S. Application Data

(60) Provisional application No. 61/084,373, filed on Jul. 29, 2008.

(51) Int. Cl.
*H02M 3/07* (2006.01)
(52) U.S. Cl. ............................ 363/60; 363/62
(58) Field of Classification Search ............... 363/59, 363/60, 62
See application file for complete search history.

(56) References Cited

U.S. PATENT DOCUMENTS

| | | | | |
|---|---|---|---|---|
| 6,055,168 A * | 4/2000 | Kotowski et al. | ............... | 363/60 |
| 6,169,673 B1 * | 1/2001 | McIntyre et al. | ............... | 363/59 |
| 6,198,645 B1 * | 3/2001 | Kotowski et al. | ............... | 363/59 |
| 6,693,808 B2 * | 2/2004 | Myono | ............... | 363/62 |
| 7,099,166 B2 * | 8/2006 | Kim | ............... | 363/60 |
| 7,304,871 B2 * | 12/2007 | Ito et al. | ............... | 363/59 |
| 7,948,301 B2 * | 5/2011 | Cook et al. | ............... | 327/536 |
| 8,089,787 B2 * | 1/2012 | Melse | ............... | 363/62 |
| 2007/0211502 A1 * | 9/2007 | Komiya | ............... | 363/59 |
| 2007/0236972 A1 * | 10/2007 | Imanaka | ............... | 363/60 |
| 2008/0013349 A1 * | 1/2008 | Yanagida et al. | ............... | 363/60 |
| 2008/0031023 A1 * | 2/2008 | Kitagawa et al. | ............... | 363/59 |
| 2010/0026264 A1 * | 2/2010 | Ben-Yaakov et al. | ............... | 323/283 |
| 2012/0044726 A1 * | 2/2012 | Voyer | ............... | 363/60 |

* cited by examiner

*Primary Examiner* — Jeffrey Sterrett
(74) *Attorney, Agent, or Firm* — The Law Office of Michael E. Kondoudis

(57) ABSTRACT

A method for constructing a direct-current to direct current (DC-DC) converter from an input voltage to an output voltage. The DC-DC converter has multiple capacitors and multiple switches connectible the capacitors. A target voltage ratio is obtained based on the input voltage and the output voltage. The target voltage is expressed as a radix number. The radix number is spawned into a code of the target voltage ratio. The code is translated into a switched-capacitor converter (SCC) configuration including the switches and the capacitors. The code may be an extended binary representation code or a Generic Fractional Numbers code. The switched-capacitor converter (SCC) configuration is preferably modified to obtain charge balance.

18 Claims, 14 Drawing Sheets

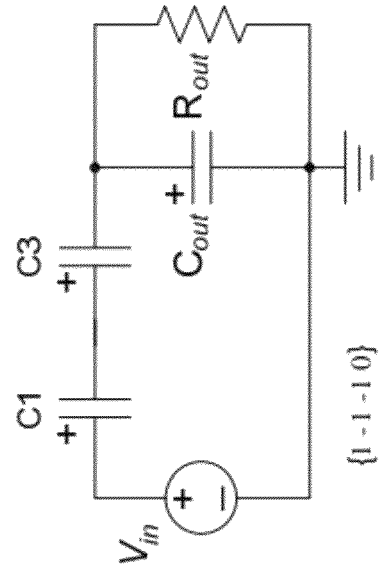
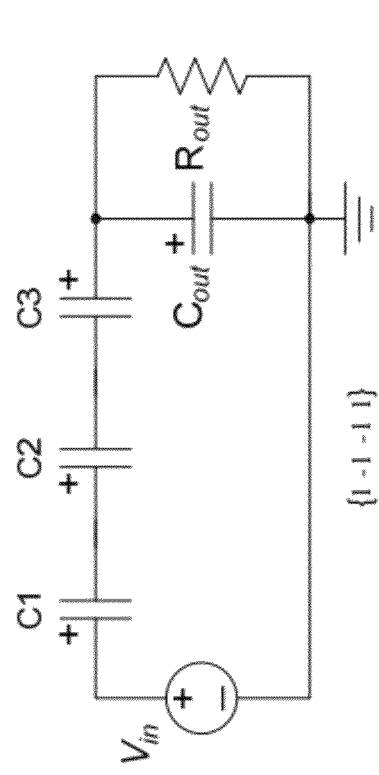
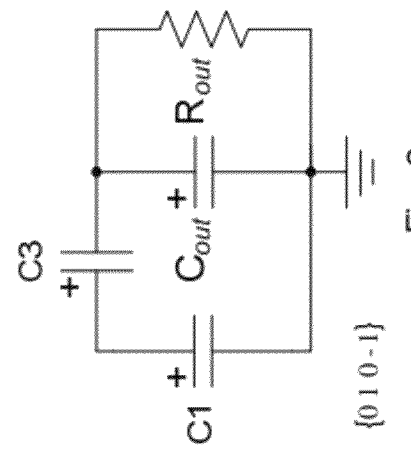
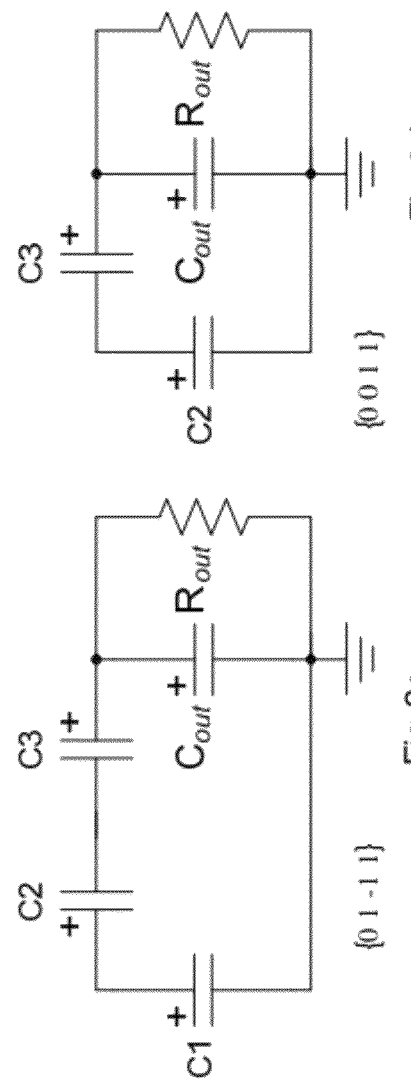

| № | Nj=1/8 | | | | Nj=2/8 | | | | Nj=3/8 | | | | Nj=4/8 | | | | Nj=5/8 | | | | Nj=6/8 | | | | Nj=7/8 | | | |
|---|---|---|---|---|---|---|---|---|---|---|---|---|---|---|---|---|---|---|---|---|---|---|---|---|---|---|---|---|
| | A0 | A1 | A2 | A3 | A0 | A1 | A2 | A3 | A0 | A1 | A2 | A3 | A0 | A1 | A2 | A3 | A0 | A1 | A2 | A3 | A0 | A1 | A2 | A3 | A0 | A1 | A2 | A3 |
| 1 | 0 | 0 | 0 | 1 | 0 | 0 | 1 | 0 | 0 | 0 | 1 | 1 | 1 | -1 | 0 | 0 | 1 | 0 | -1 | -1 | 1 | 0 | -1 | 0 | 1 | 0 | 0 | -1 |
| 2 | 0 | 0 | 1 | -1 | 0 | 1 | -1 | 0 | 0 | 1 | 0 | -1 | 0 | 1 | 0 | 0 | 1 | -1 | 0 | 1 | 1 | -1 | 1 | 0 | 1 | 0 | -1 | 1 |
| 3 | 0 | 0 | 0 | 1 | 0 | 0 | 1 | 0 | 1 | -1 | -1 | 1 | 1 | -1 | 0 | 0 | 0 | 1 | 1 | -1 | 1 | 0 | 1 | 0 | 1 | 0 | 0 | -1 |
| 4 | 0 | -1 | -1 | 1 | 1 | -1 | 1 | 0 | 0 | 1 | 0 | -1 | 0 | 1 | 0 | 0 | 1 | -1 | -1 | 1 | 0 | 1 | 1 | 0 | 1 | -1 | 1 | 1 |
| 5 | 0 | 0 | 0 | 1 | 0 | 0 | 1 | 0 | 0 | 0 | 1 | 1 | 1 | -1 | 0 | 0 | 1 | 0 | -1 | -1 | 1 | 0 | -1 | 0 | 1 | 0 | 0 | -1 |
| 6 | 0 | 0 | 1 | -1 | 0 | 1 | -1 | 0 | 0 | 1 | -1 | 1 | 0 | 1 | 0 | 0 | 0 | 1 | 1 | -1 | 1 | -1 | 1 | 0 | 1 | 0 | -1 | 1 |
| 7 | 0 | 0 | 0 | 1 | 0 | 0 | 1 | 0 | 0 | -1 | -1 | 1 | 1 | -1 | 0 | 0 | 1 | 0 | 1 | -1 | 1 | 0 | -1 | 0 | 1 | 0 | 0 | -1 |
| 8 | 1 | -1 | -1 | 1 | 1 | -1 | 1 | 0 | 1 | -1 | 0 | -1 | 0 | 1 | 0 | 0 | 0 | 1 | 0 | 1 | 0 | 1 | 1 | 0 | 0 | 1 | 1 | 1 |

Figure 5

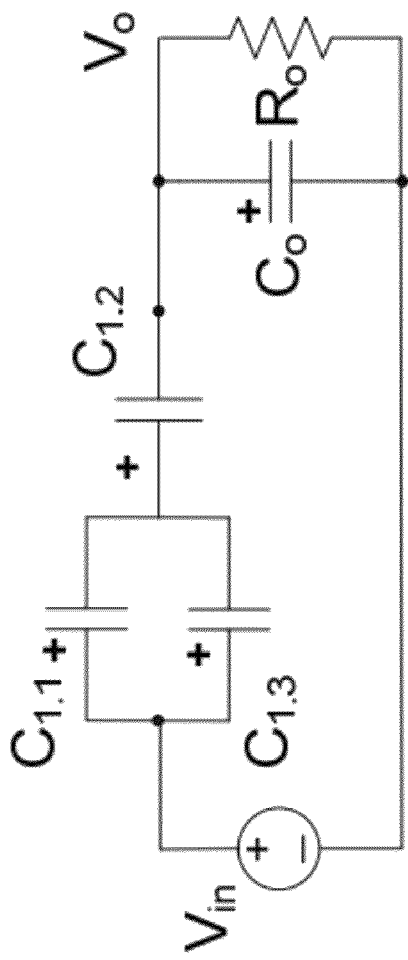
Fig. 16b {1-2}
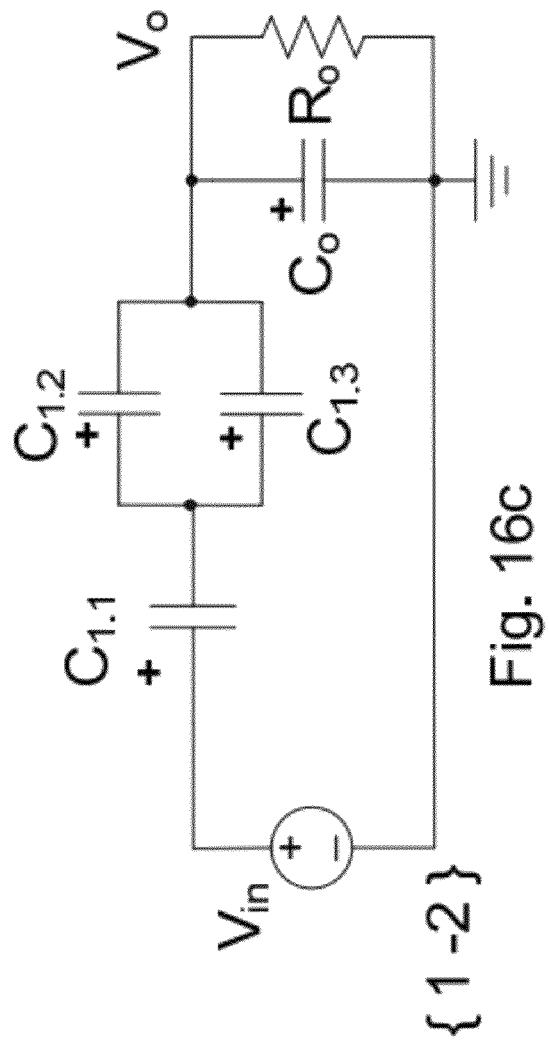
Fig. 16c {1-2}
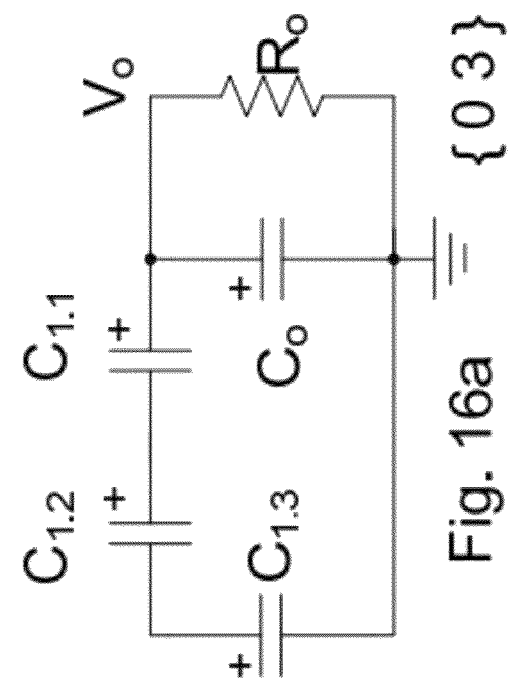
Fig. 16a {0 3}

SELF-ADJUSTING SWITCHED-CAPACITOR CONVERTER WITH MULTIPLE TARGET VOLTAGES AND TARGET VOLTAGE RATIOS

CROSS REFERENCE TO RELATED APPLICATIONS

The present application benefits from U.S. provisional application 61/084,373 filed on 29 Jul. 2008 by the present inventors.

FIELD OF THE INVENTION

The present invention relates to high-efficiency switched-capacitor DC-to-DC converters.

BACKGROUND OF THE INVENTION

Switched-Capacitor Converters (SCC) are preferred over inductor based switch-mode regulators in low power applications, when the application calls for small size and if the electromagnetic field radiated from the switched inductor may pose a problem. Therefore, SCC are popular in power management of mobile devices where the electromagnetic interference could be a problem and small size is a must. However, SCC suffer from a fundamental power loss deficiency that make their use in some applications prohibitive. The power loss is due to the inherent energy dissipation when a capacitor is connected to a voltage source or another capacitor that have different voltage from the capacitor's voltage (before the interconnection). Theory predicts that this power loss is proportional to $(\Delta V)^2$ where $\Delta V$ is the voltage differences before connection. As a result, SCC will exhibit a rather high efficiency if, during the switching cycle, the capacitors are connected to voltages (power sources and other capacitors) that have a similar voltage to the voltage across said capacitor. It is thus a well known phenomenon that when SCC are operated around the target conversion ratio (input to output voltage), the efficiency will be high and may exceed 90%. But when the same SCC is operated at a different conversion ratio, the efficiency drops dramatically. This is due to the fact that in the target ratio the capacitors do not see appreciable voltage variations. In practical applications one would expect the operational input to output voltage conversion ratio to change and hence there is no way to escape the losses in the prior art SCC in which the 'target' conversion ratios are limited to one or several conversion ratio values which are spread apart. For example, Linear Technology's (CA, USA) SCC LTC1999 can be configured for target input to output conversion ratios of 1/2 and 2/3 and hence at these ratios the efficient is relatively high. However, in between and outside this conversion ratio the efficiency drops dramatically.

The inherent loss mechanism in prior art SCC is a severe limitation considering the importance of high efficiency in general and in mobile equipment in particular since it shortens the battery life.

Thus there is a need for and it would be highly advantageous to have a SCC design that will have target conversion ratios that are spaced at high resolution over the range of interest and thereby improve the efficiency of the power management systems.

BRIEF SUMMARY

According to an embodiment of the present invention there is provided a direct-current to direct current (DC-DC) converter adapted for converting an input voltage to an output voltage. The DC-DC converter includes multiple capacitors and multiple switches connectible to the capacitors. The capacitors are connected by the switches based on an extended binary representation of a target ratio of the input voltage to the output voltage of the DC-DC converter. During operation of the converter, charge and discharge instances of the capacitors are preferably balanced for a block switching cycle according to the extended binary representation and the charge and discharge instances of the capacitors follow each other. The output to input transfer ratio may be smaller than 1 or larger than 1. During operation of the DC-DC converter, the target ratio may vary to a second target ratio and in response the switches are reconfigured based on a second extended binary representation of the second target ratio. A switch controller is configured for controlling the switches. Feedback between the output voltage to the switch controller may be used to stabilize the output voltage for achieving the target ratio. The switch controller may be configured for controlling the switches by dithering in time between at least two extended binary representations of at least two target ratios. A linear regulator may be disposed between the block of switched capacitors and the output voltage.

According to another embodiment of the present invention there is provided a step-down DC-DC converter including a controller and a capacitor-switch assembly including multiple capacitors and multiple switches. The capacitor-switch assembly receives an input voltage, and outputs an output voltage. The capacitor-switch assembly receives a sequence for connection of the capacitors via the switches so as to generate the output voltage being controlled by the controller according to an algorithm by dithering in time between at least two extended binary representations of at least two target ratios. The target ratios including ratios of the input voltage and the output voltage. A linear regulator is disposed between the block of switched capacitors and the output voltage.

According to yet another embodiment of the present invention, a direct-current to direct current (DC-DC) converter is adapted for converting an input voltage to an output voltage. The DC-DC converter includes multiple capacitors and multiple switches connectible to the capacitors. The capacitors are connected by the switches based on a Generic Fractional Numbers (GFN) representation of a target ratio of the input voltage to the output voltage of the DC-DC converter. During operation of the converter charge and discharge instances of the capacitors are preferably balanced for a block switching cycle according to the Generic Fractional Numbers (GFN) representation and the charge and discharge instances of the capacitors follow each other. The output to input transfer ratio may be smaller than 1 or larger than 1. During operation of the DC-DC converter, the target ratio may vary to a second target ratio and in response the switches are reconfigured based on a second Generic Fractional Numbers (GFN) representation of the second target ratio.

According to yet another embodiment of the present invention there is provided a method for constructing a direct-current to direct current (DC-DC) converter from an input voltage to an output voltage. The DC-DC converter has multiple capacitors and multiple switches connectible the capacitors. A target voltage ratio is obtained based on the input voltage and the output voltage. The target voltage is expressed as a radix number. The radix number is spawned into a code of the target voltage ratio. The code is translated into a switched-capacitor converter (SCC) configuration including the switches and the capacitors. The code may be an extended binary representation code or a Generic Fractional Numbers code. The switched-capacitor converter (SCC) configuration is preferably modified to obtain charge balance.

BRIEF DESCRIPTION OF DRAWINGS

The invention is herein described, by way of example only, with reference to the accompanying drawings, wherein:

FIG. 3a shows capacitor connections that follow the EXB sequences for $N_j$=3/8 (shown in FIG. 2) where {A0=1, A1=−1, A2=−1 and A3=1}.

FIG. 3b shows capacitor connections that follow the EXB sequences for $N_j$=3/8 (shown in FIG. 2) where {A0=1, A1=−1, A2=−1 and A3=0}.

FIG. 3c shows capacitor connections that follow the EXB sequences for $N_j$=3/8 (shown in FIG. 2) where {A0=0, A1=1, A2=−1 and A3=1}.

FIG. 3d shows capacitor connections that follow the EXB sequences for $N_j$=3/8 (shown in FIG. 2) where {A0=0, A1=0, A2=1 and A3=1}.

FIG. 3e shows capacitor connections that follow the EXB sequences for $N_j$=3/8 (shown in FIG. 2) where {A0=1, A1=0, A2=1 and A3=1}.

FIG. 5 lists the Extended Binary (EXB) sequences for j=3 arranged for minimum output ripple according to an embodiment of the present invention.

FIGS. 6(a) and 6(b) show the convergence of a DC-DC converter according to this invention when $V_{in}$=8 Volt, j=3, $N_j$=3/8, wherein FIG. 6a is graph of a simulation of output voltage from start up and FIG. 6b are graphs of actual experimental results with channel 1 showing a trace of output voltage and channel 2 input voltage graphed against time;

FIGS. 16a, 16b and 16c show switched capacitor converter (SCC) circuit configurations obtained using the method of FIG. 15.

Figures 1, 2:
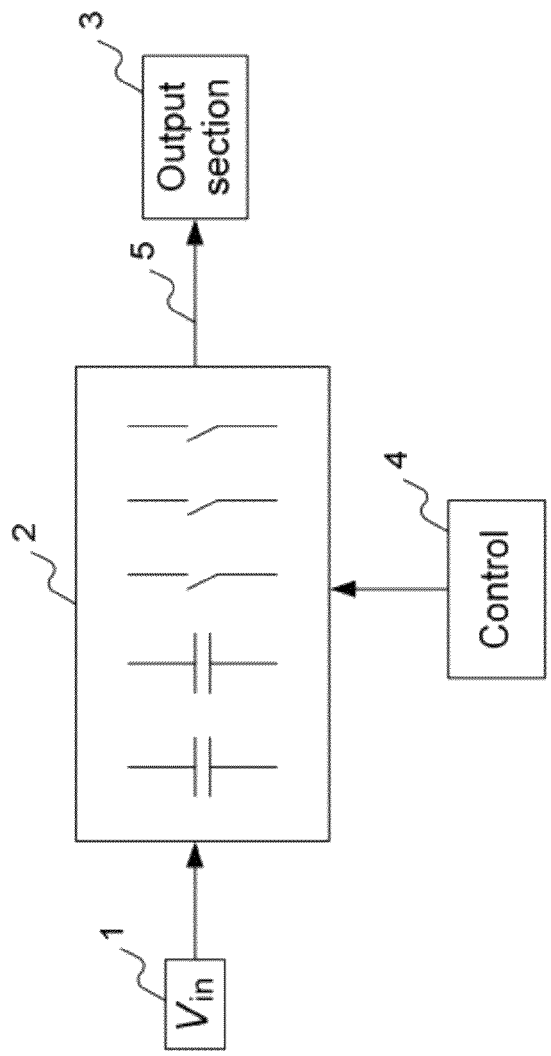
FIG. 1 depicts a general structure of a step-down DC-DC converter according to an embodiment of the present invention.
FIG. 2 lists the Extended Binary (EXB) sequences for j=3 according to an embodiment of the present invention.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 illustrates a general configuration of a DC-DC converter according to embodiments of the present invention. An input voltage $V_{in}$ 1, a capacitor-switch assembly 2, a control section 4, and a output section 3 fed by an output voltage $V_{out}$ over line 5. The sequence for capacitor connection to generate a given output voltage $V_{out}$ is controlled by control block 4 according to a novel algorithm. The theoretical aspects of this algorithm are first disclosed in the following.

Any number $N_j$ in the range of 0 to 1, can be represented by a sum of binary elements of the form:

$$N_j = A_0 2^{-0} + A_1 2^{-1} + A_2 2^{-2} + A_3 2^{-3} + A_3 2^{-4} \ldots A_j 2^{-j} \quad (1)$$

where $A_0$ is 0 or 1 and the coefficients $A_1, A_2 \ldots A_j$ can take the values 0, 1, −1 while the indexing integer j sets the resolution.

Similar to the classical binary representation, any number in this Extended Binary (EXB) form can be defined by a sequence of the integers 0, 1, −1. For example, the sequence:
{1 0−1 1}
Implies:

$$N_3 = 1 \cdot 2^{-0} + 0 \cdot 2^{-1} - 1 \cdot 2^{-3} = 7 \cdot 2^{-3} = 7/8$$

The EXB representation of (1) differs from the classical binary number since any $A_j$ (for j>0) can be −1. That is, it includes not only zero and unity summing terms but also subtracting terms. The consequence of this deviation from the classical binary representation is that more than one sequence can represent any given number within the relevant range. For example, the number 3/8 can be expressed as {0 1 1} and as {1 0−1}.

The following novel rule of this invention can be used to generate all the EXB sequences corresponding to a given number within the relevant range. The rule involves adding and subtracting "1" coefficients to the sequence as follows;

For any $A_j$=1 (j>0) in a EXB sequence, add to the sequence $2^{-j}$ and then replace the coefficient of $A_j$ (that was originally "1") by '−1'.

Since this operation adds and subtracts $2^{-j}$, the original number is not altered. By repeating this operation on each '1' coefficient of the original sequence, and on the generated sequences, alternative EXB sequences are formed for same number. For example, consider the number 5/8.

The basic binary representation is:

0 1 0 1

Starting with the least significant bit (LSB) '1' we add $2^{-3}$:

0 1 0 1+0 0 0 1=0 1 1 0

Replacing the original '1' coefficient of the term $2^{-3}$ with '−1' we find a new equivalent sequence:

0 1 1 −1

This procedure can now be repeated on the $A_1$ term of the original sequence {0 1 0 1} which is also equal to '1' resulting in:

1−1 0 1

The operation can than be performed on the new '1' coefficients in the newly generated sequences {0 1 1−1}, {1−1 0 1} to generate additional equivalent representation:

From {0 1 1−1} we can generate {1 0−1−1} and {1−1 1−1}

It follows then that the number 5/8 can be represented by the 5 following EXB sequences:

0 1 0 1
    0 1 1−1
    1−1 0 1
    1 0−1−1
    1−1 1−1

An important corollary (Corollary 1) of the above sequence generating procedure is:

The minimum number of EXB sequences that can represent any given number with a resolution j for the range of 0 to 1 is j+1.

This is because each of the '1's in the original sequence will generate a new sequence, and since each '0' in the original sequence will turn to '1' in a generated sequence, it can also be operated on to spawn a new sequence. So the minimum number of sequences is the original sequence plus j that is, j+1.

Reference is now made to FIG. 2 which includes a table of EXB sequences for j=3, according to embodiments of the present invention. The odd numbers 1/8, 3/8, 5/8, 7/8 are at highest resolution (j=3) and the minimum number of EXB sequences is j+1 which demonstrates the above theorem. The same goes for the lower resolution numbers (j=2, 2/8, 6,8) with a minimum of 3 sequences and for the lowest resolution number (j=1, 4/8) with a minimum of 2 sequences.

Another important corollary (Corollary 2) of the sequence generating procedure is:

For each "1" in a EXB sequence of a given number there will generate at least one '−1' in same position of another sequence.

This is because the generation process involves replacing "1' by a '−1'.

Based on the above features of the EXB sequences we consider next a DC-DC step down conversion system that includes an input voltage source Vin, and output capacitor $C_o$ connected in parallel to a load $R_o$ and a set of j capacitors $C_j(J>0)$ which are charged to binary fractions of the input voltage Vin. That is, C1 is charged to $Vin*2^{-1}$, C2 is charged to $Vin*2^{-2}$ and the jth capacitor Cj is charged to $Vin*2^{-j}$. We further assume at this stage that $C_o$ is charges to $N_j Vin$ where $N_j$ is the required conversion ratio. The connection of the capacitors will be carried out according to the following rules:

1. Each capacitor $C_j(j>0)$ is associated with the corresponding coefficient $A_j$ of the EXB sequences that represent the required conversion ratio $N_j$.

2. When $A_j=0(j>0)$ in an EXB sequence that represent $N_j$, capacitor Cj is not connected.
3. When $A_j=1(j>0)$ in a EXB sequence capacitor Cj is connected in series with the load in opposite polarity.
4. When $A_j=-1$ (j>0) in an EXB sequence that represent $N_j$, capacitor Cj is connected in series to the load in same polarity.
5. When $A_0=0$ in an EXB sequence that represent $N_j$, the input source Vin is not connected.
6. When $A_0=1$ the input source Vin is connected in series with output (and possibly is series with some capacitors according to above rules) in opposite polarity.

The above rules are demonstrated by the following example: we consider the EXB sequences of $N_j=3/8$ as given in Table I (FIG. 2). Since j=3 we engage three capacitors C1, C2, C3. Each EXB sequence corresponds to a connection between $V_{in}$, $C_{out}$, C1, C2, and C3 per the above rules. We assume in this demonstrative example that C1 is charged to Vin/2, C2 to Vin/4 and C3 to Vin/8 (that is, $V_{Cj}=V_{in}2^{-j}$ for j>0) and Cout to $N_j$Vin. Following the above rules, each of the EXB sequence for Nj=3/8 leads to a specific connection as depicted in FIGS. 3a, 3b, 3c, 3d and 3e.

Considering the fact that the capacitors duplicate the EXB sequences for Nj=3/8 and that the $C_{out}$ voltage was initially set to $N_j$Vin, it is evident that each of the configurations of FIGS. 3a, 3b, 3c, 3d and 3e are in steady state condition. This is a result of the fact that by changing the capacitors interconnection according to EXB sequences for $N_j=3/8$ in a cyclic way (as shown schematically in FIG. 4) the output section will always see a voltage source of Vin*3/8. Furthermore, each of the $C_j$ capacitors will discharge when in some EXB sequences and then charge in other sequence configurations maintaining thereby its voltage $Vin/2^j$. Recharging of the capacitors is assured because for any $A_j=1$ in a given sequence (which implies discharging) there will be an EXB sequence in which the associated coefficient is '−1' (Corollary 2) which implies that the capacitor will be charging. This assures that each capacitor will have charging and discharging periods and the voltage on it will be kept constant, save the ripple.

Figure 4:
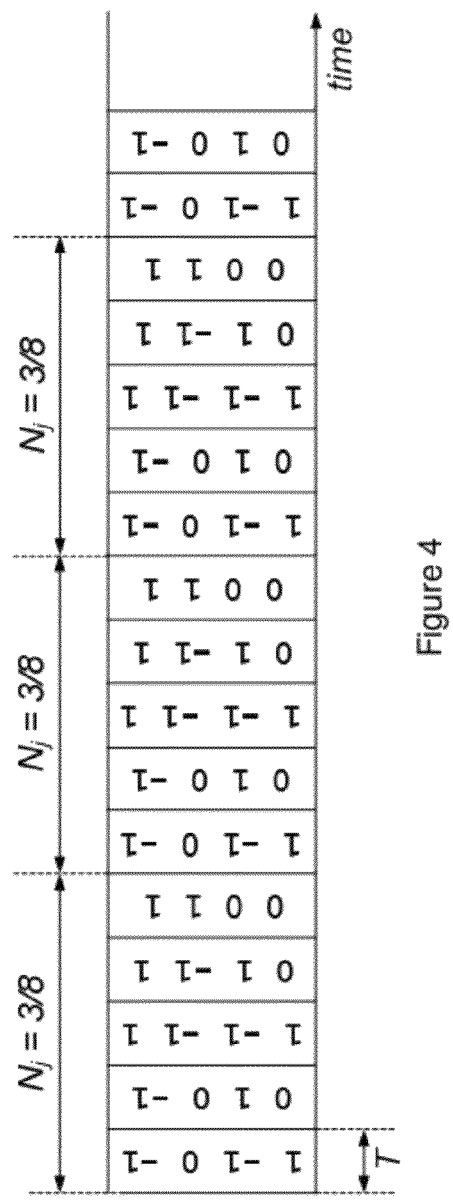
FIG. 4 demonstrates the perpetual EXB sequences of the converter when the target conversion voltage ratio (input/output) is set to 3/8.

It is thus evident from the above, that repeating the EXB sequences for a given conversion ratio $N_j$ in a cyclic manner as depicted conceptually in FIG. 4 (for $N_j=3/8$), the output will be maintained at a voltage which is equal to the input voltage times that conversion ratio $N_j$, and that the capacitors' voltage $V_{Cj}(J>0)$ will be kept at a binary fraction of the input voltage $V_{in}2^{-j}$.

Furthermore, the capacitors' binary voltages and the specified output voltage will be reached automatically even if the system is subjected to a disturbance or when it starts with zero voltage on the capacitors. This is can be shown as follows.

Assume that the capacitors voltages at steady state are unknown, including the voltage of the output capacitor $C_{out}$, and that the system is switching according to an EXB sequences for a given conversion ratio $N_j$. Denoting the capacitors' voltage as $V_{Cout}, V_{C1} \ldots V_{Cj}$ one can write j+1 equations for the EXB sequences (Corollary 1) for the j+1 unknown ($V_{Cout}$ plus j capacitor voltages $V_{Cj}$) of the form;

$$V_{Cout} = A_o Vin + \sum_{i=1}^{j} A_i V_{Ci} \qquad (2)$$

The solution of this set of equations corresponds to the canonic form of $N_j$. That is, $V_{Cout}=Vin*N_j$, $V_{C1}=Vin/2$, $V_{C2}=Vin/4 \ldots V_{Cj}=Vin/2^j$. This is illustrated by the following example:

Consider the case of a conversion ratio of 3/8 (Table I (FIG. 2) and FIG. 3). In this case one can write the following equations for the EXB sequences corresponding to 3/8 (Table I (FIG. 2) and FIG. 3):

$$V_{in} - V_{C_1} - V_{C_2} + V_{C_3} = V_{Cout}$$
$$V_{C_1} - V_{C_2} + V_{C_3} = V_{Cout}$$
$$V_{in} - V_{C_1} - V_{C_3} = V_{Cout}$$
$$V_{C_1} - V_{C_3} = V_{Cout}$$
$$V_{C_2} + V_{C_3} = V_{Cout}$$

This set of equations has a degree of freedom (5 equations for 4 unknowns) but it does give a unique solution as theoretically predicted:

$$V_{C1} = \frac{Vin}{2}$$
$$V_{C2} = \frac{Vin}{4}$$
$$C_{C3} = \frac{Vin}{3}$$
$$V_{Cout} = 3/8 \ Vin$$

The solvability of equation (2) for all conversion ratios $N_j$ for EXB sequences up to J=12 was proven numerically and it is expected that is holds universally. Notwithstanding the fact that equation (2) solves $V_{Cout}$ as a function of $V_{in}$, by it will also solve $V_{in}$ as a function of $V_{Cout}$. This implies that, by simply switching between the input and output terminals, the DC-DC converter of this invention can be used as a step up converter. In the above example, this will result in a output to input voltage ratio of 8/3.

The convergence of the DC-DC conversion systems from zero capacitors' voltages to the steady state voltage was proven by simulation and experimentally. FIG. 5 depicts, as an example, the experimental output voltage versus time of a DC-DC conversion system in which Vin=8, j=3 and $N_j$=3/8.

Figure 6A:
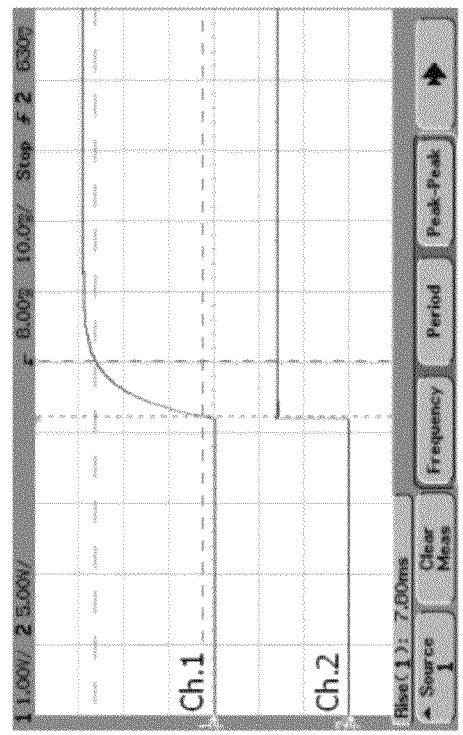
Figure 6B:
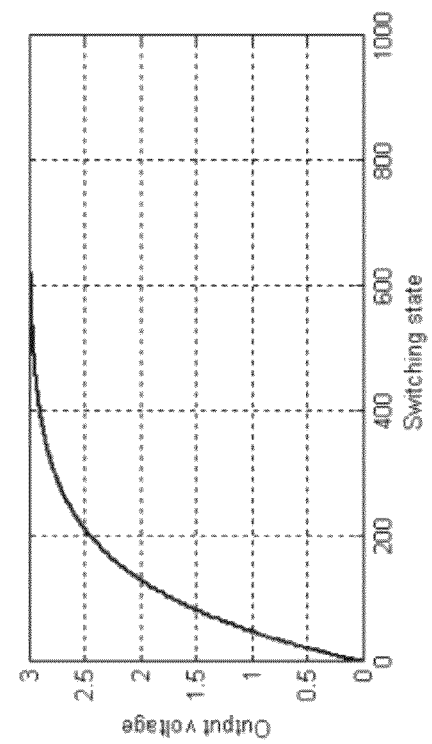

Assuming a relatively large output capacitor $C_{out}$ the output ripple of DC-DC converter built according to this invention will be affected by the voltage ripple across the switching capacitor. Furthermore, since this ripple will reduce the average output voltage in will also reduce the efficiency. This is because the efficiency is dependent on the output to input voltage ratio. The voltage ripple across the switching capacitor is reduced, according to this invention, by arranging the switching sequences in blocks such that each capacitor will have an equal number of charge/discharge instances in each block and that a charging instance will follow a discharge instance, and vise versa. This block arrangement is illustrated in FIG. 6 for j=3. In this case the blocks for each $N_j$ consists of 8 EXB sequences keeping the charge/discharge sequences balanced and following each other.

Similar to the binary case given above, we define the generic sequence $N_n(r)$ of radix r in the range (0, 1) as:

$$N_n(r) = A_0 + \sum_{j=1}^{n} A_j r^{-j} \quad (3)$$

where $A_0$ is 0 or 1, $A_j$ takes any of the values 1−r, ..., −1, 0, 1, ..., r−1, and n is the resolution. For example, the code {1 −2 2} for radix 3 implies:

$$N_2(3) = 1 - 2 \cdot 3^{-1} + 2 \cdot 3^{-2} = 5/9 \quad (4)$$

Expression (3) defines Generic Fractional Numbers (GFN) representation, which is akin to the Generalized Signed-Digit (GSD) representation. The special case of the GFN $N_n(r)$ where all the coefficients $A_j$ are non-negative is identical to the representation of $N_n(r)$ in the conventional number system with the radix r (e.g. decimal). This code is called hereinafter the original code.

A rule for spawnin the GFN codes: This procedure is iterative and starts from any $A_j>0(j>0)$ in the original code of $N_n(r)$. Adding "r−1" to this $A_j$ results in $A_{j<(r-1)}$ and "1" as a carry. To maintain the value of $N_n(r)$ we add "−(r−1)" to the resulting $A_j$ spawning thereby a new GFN code. The procedure is repeated for all $A_j>0$ in the original code and for all $A_j>0$ in each spawned GFN code.

In example (5) three alternative GFN codes are spawned from the original code of $N_2(3)=4/9$. The GFN codes for other fractions $N_n(3)$, n=1, 2 are summarized in Table 2.

$$\begin{array}{ccc}
3^0 & 3^{-1} & 3^{-2} \\
\hline
0 & 1 & 1 \\
0 & 0 & 2 \\
\hline
0 & 2 & 0 \\
0 & 0 & -2 \\
\hline
0 & 2 & -2
\end{array}
\quad
\begin{array}{ccc}
3^0 & 3^{-1} & 3^{-2} \\
\hline
0 & 1 & 1 \\
0 & 2 & 0 \\
\hline
1 & 0 & 1 \\
0 & -2 & 0 \\
\hline
1 & -2 & 1
\end{array}
\quad
\begin{array}{ccc}
3^0 & 3^{-1} & 3^{-2} \\
\hline
0 & 2 & -2 \\
0 & 2 & 0 \\
\hline
1 & 1 & -2 \\
0 & -2 & 0 \\
\hline
1 & -1 & -2
\end{array} \quad (5)$$

The three alternative GFN codes thus generated represent of course the same fraction $N_2(3)=4/9$:

$$\{0\ 2\ -2\} \rightarrow 0 + 2 \cdot 3^{-1} - 2 \cdot 3^{-2} = 4/9$$
$$\{1\ -2\ 1\} \rightarrow 1 - 2 \cdot 3^{-1} + 1 \cdot 3^{-2} = 4/9 \quad (6)$$
$$\{1\ -1\ -2\} \rightarrow 1 - 1 \cdot 3^{-1} - 2 \cdot 3^{-2} = 4/9$$

The spawning rule of the GFN codes brings about again the two following Corollaries:

Corollary 1: For the resolution n the minimum number of GFN codes for a given $N_n(r)$ is (n+1).

This is because each of the $A_j 0(j>0)$ in the original code with resolution n generates a new GFN code and a carry. Furthermore, since the spawning results in the propagation of a carry, each $A_j=0 \ j>0)$ in the original code will turn into a "1", which will also be operated-on to spawn a new GFN code.

Corollary 2: For each $A_j>0(j>0)$ in either the original or the GFN code for a given $N_n(r)$ there will be at least one $A_j<0$ in another GFN code of this $N_n(r)$.

This is because the spawning procedure involves the subtraction of "r−1" from $A_j>0$ and since Aj is always smaller than (r−1) the result will always be $A_j<0$.

TABLE 2

The GFN codes of $N_n(3)$, n = 1, 2.

| $N_2(3) = 1/9$ | | | $N_2(3) = 2/9$ | | | $N_1(3) = 3/9$ | | | $N_2(3) = 4/9$ | | |
|---|---|---|---|---|---|---|---|---|---|---|---|
| $A_0$ | $A_1$ | $A_2$ | $A_0$ | $A_1$ | $A_2$ | $A_0$ | $A_1$ | $A_2$ | $A_0$ | $A_1$ | $A_2$ |
| 1 | −2 | −2 | 1 | −2 | −1 | 1 | −2 | 0 | 1 | −1 | −2 |
| 0 | 1 | −2 | 0 | 1 | −1 | 0 | 1 | 0 | 0 | 2 | −2 |

TABLE 2-continued

The GFN codes of $N_n(3)$, n = 1, 2.

| 0 | 0 | 1 | 0 | 0 | 2 | | | | 1 | −2 | 1 |
|---|---|---|---|---|---|---|---|---|---|---|---|
|   |   |   |   |   |   |   |   |   | 0 | 1  | 1 |

| $N_2(3) = 5/9$ | | | $N_1(3) = 6/9$ | | | $N_2(3) = 7/9$ | | | $N_2(3) = 8/9$ | | |
|---|---|---|---|---|---|---|---|---|---|---|---|
| $A_0$ | $A_1$ | $A_2$ | $A_0$ | $A_1$ | $A_2$ | $A_0$ | $A_1$ | $A_2$ | $A_0$ | $A_1$ | $A_2$ |
| 1 | −1 | −1 | 1 | −1 | 0 | 1 | 0  | −2 | 1 | 0  | −1 |
| 0 | 2  | −1 | 0 | 2  | 0 | 1 | −1 | 1  | 1 | −1 | 2  |
| 1 | −2 | 2  |   |    |   | 0 | 2  | 1  | 0 | 2  | 2  |
| 0 | 1  | 2  |   |    |   |   |    |    |   |    |    |

The special case of the EXB based SCC, can be extended to the general GFN fraction $N_n(r)$ case by following the concepts detailed above. However, unlike the case of the EXB each coefficient $A_j$ of the $N_n(r)$ will be associated with more than one capacitor. The number of capacitors associated with each coefficient will depend on the maximum number in column j of the GFN codes for a given $N_n(r)$. In the general case when the SCC is expected to be configured for all the values of $N_n(r)$, each column j will be associated with r−1 capacitors. For example, for the $N_2(3)$ case each column will require (for the general case) 2 capacitors (r−1=3−1) and a total of 4 capacitors (2×2). The translation of the GFN representation to the SCC topologies can be accomplished by following rules.

1) If $A_0=1$ then $V_{in}$ is connected in a polarity that charges the output.
2) If $A_0=0$ then $V_{in}$ is not connected.
3) If $A_j=0$ then all r−1 capacitors $C_{jx}$ of the group j are disconnected.
4) If $A_j<-1$ then $|A_j|$ capacitors $C_{jx}$ of group j are connected in series with the output in the charge polarity, while the remaining j capacitors are connected in parallel to any of the $C_{jx}$ capacitors in same polarity.
5) If $A_j=-1$ then all capacitors $C_{jx}$ of the group j are connected in parallel and the group is connected in series with the output in the charge polarity.
6) If $A_j=1$ then all capacitors $C_{jx}$ of the group j are connected in parallel and the group is connected in series with the output in the discharge polarity.
7) If $A_j>1$ then $A_j$ capacitors $C_{jx}$ of the group j are connected in series in same polarity and the group is connected in series with the output in the discharge polarity, while the remaining j capacitors are connected in parallel to any of $C_{jx}$ capacitors in same polarity.

Figure 7A:
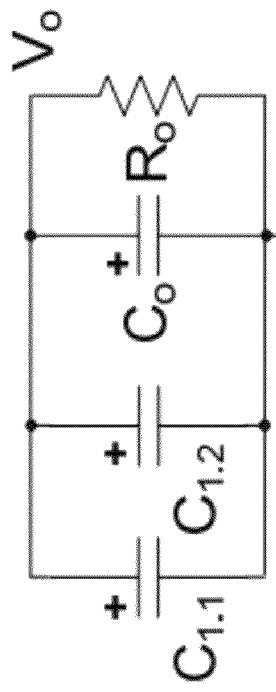
FIG. 7a shows an example to the relationship between GFN codes and SCC topologies in the case of $N_1$(3)=1/3 with GFN codes {0 1}.
Figure 7B:
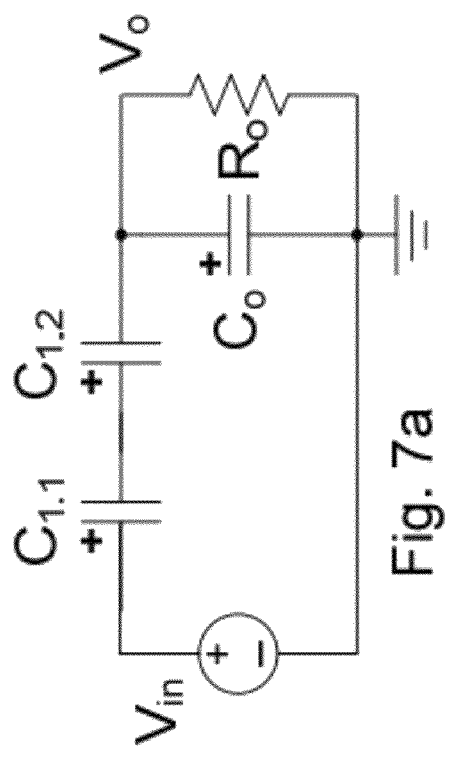
FIG. 7b shows an example to the relationship between GFN codes and SCC topologies in the case of $N_1$(3)=1/3 with GFN codes {1 −2}.

As an example to the relationship between GFN codes and SCC topologies we consider the case of $N_1(3)=1/3$ and $N_1(3)=2/3$, that is one bit, radix 3, given in FIGS. 7a, 7b and FIGS. 8a, 8b respectively. The GFN codes for the 1/3 case are {0 1} and {1 −2} which translate into two configurations of FIG. 7a and FIG. 7b showing capacitors connections that follow the GFN codes of $N_1(3)=1/3$. Because the capacitors $C_{1.1}$ and $C_{1.2}$ are connected in parallel, their voltages are identical and are denoted as $V_C$. It is assumed that in steady state $C_{1.1}$ and $C_{1.2}$ keep the same voltage $V_C$ in the series connection. The KVL equations for this case are:

$$\begin{cases} 1 \cdot V_{in} - 2 \cdot V_C = V_o \\ 0 \cdot V_{in} + 1 \cdot V_C = V_o \end{cases} \quad (7)$$

and the solution of (7) is:

$$V_o = V_C = \frac{1}{3} V_{in} \quad (8)$$

Figure 8A:
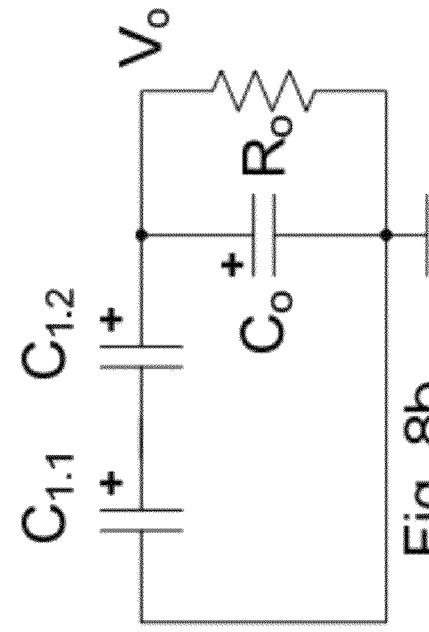
FIG. 8a shows an example to the relationship between GFN codes and SCC topologies in the case of $N_1$(3)=2/3, EXB codes of $M_1$=1/2({0 1}; radix 2.
Figure 8B:
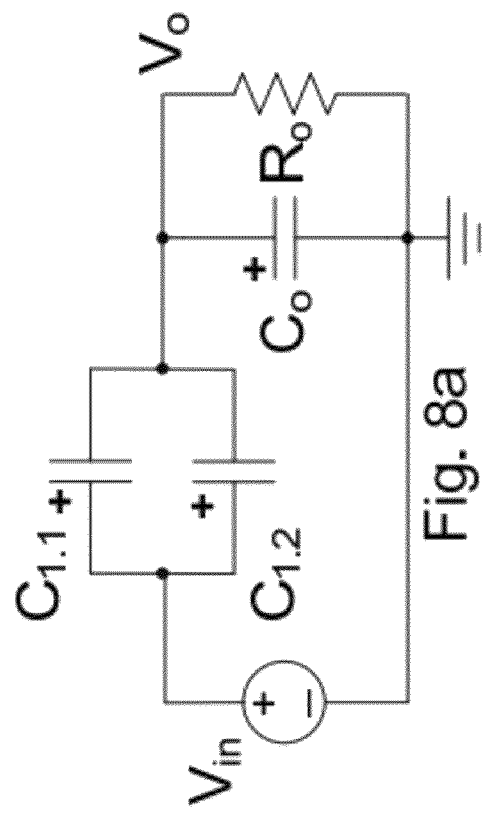
FIG. 8b shows an example to the relationship between GFN codes and SCC topologies in the case of $N_1$(3)=2/3, EXB codes of $M_1$=1/2({1 −1}; radix 2.

Similarly, the case of $N_1(3)=2/3$ translates into the configurations of FIG. 8a and FIG. 8b:

The KVL equations are in this case:

$$\begin{cases} 1 \cdot V_{in} - 1 \cdot V_C = V_o \\ 0 \cdot V_{in} + 2 \cdot V_C = V_o \end{cases} \quad (9)$$

The solution of (8) is:

$$V_C = \frac{1}{3} V_{in} \quad (10)$$
$$V_o = \frac{2}{3} V_{in}$$

Given m capacitors in the circuit, they can be rearranged by the SCC switches to follow an EXB or a GFN codes or both. For example, using one of the capacitors (or the two in parallel) of the SCC shown in FIG. 8a and FIG. 8b, one can realize the EXB codes of $M_1=1/2(\{0\ 1\}, \{1\ -1\}$; radix 2). By this, the number of target voltages can be increased (1/2, 2/3) as implemented in the commercial SCC. Moreover, using the same two capacitors, the transfer ratio 1/3 can also be added (FIG. 7a and FIG. 7b) to farther increase the number of target voltages (1/3, 1/2, 2/3). Of course, this will possibly require more switches, increasing the complexity of the circuit as well as the losses.

Figure 11:
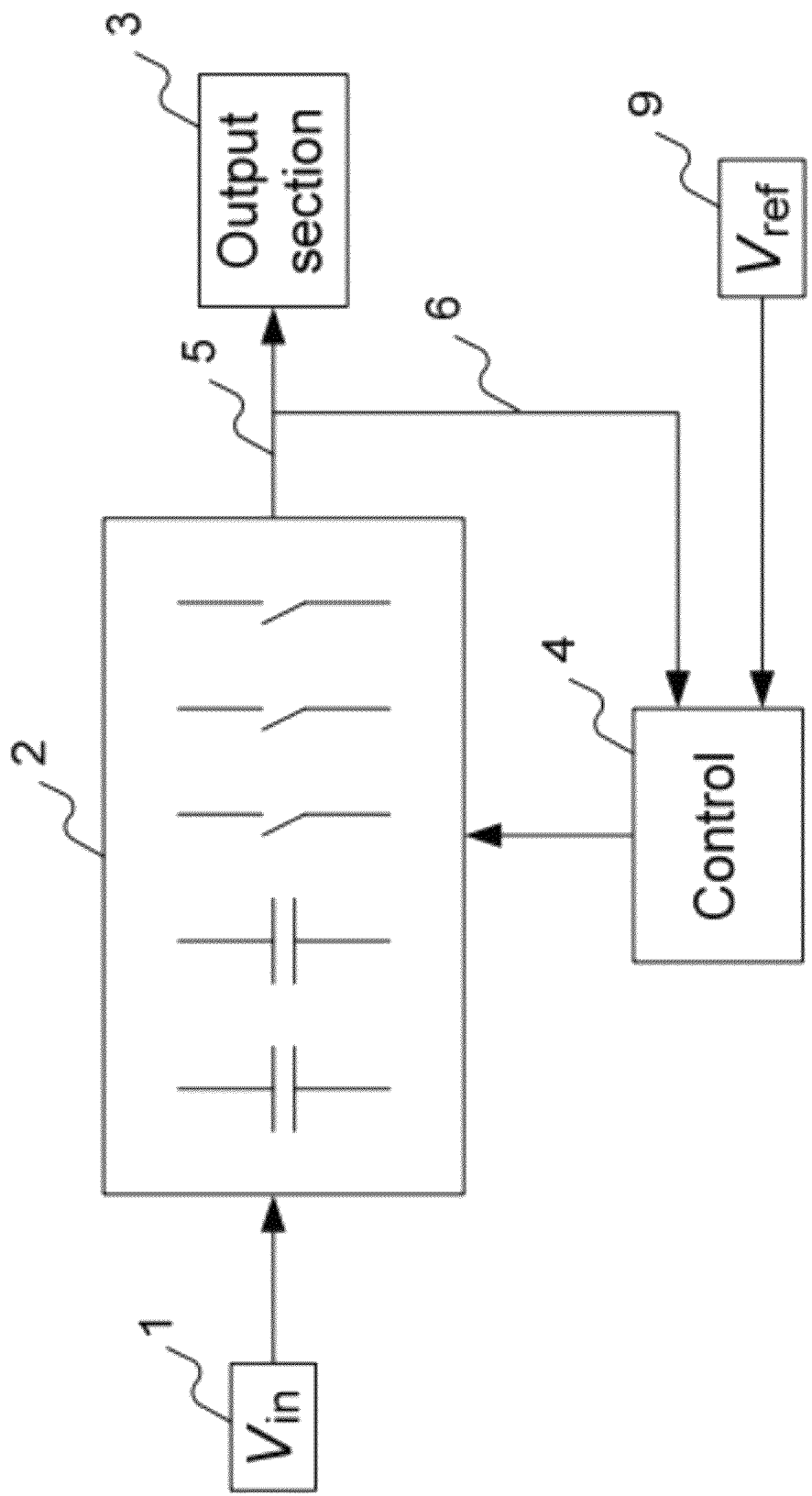
FIG. 11 illustrates the implementation of basic feedback to maintain the output voltage at a desired value.
Figure 13:
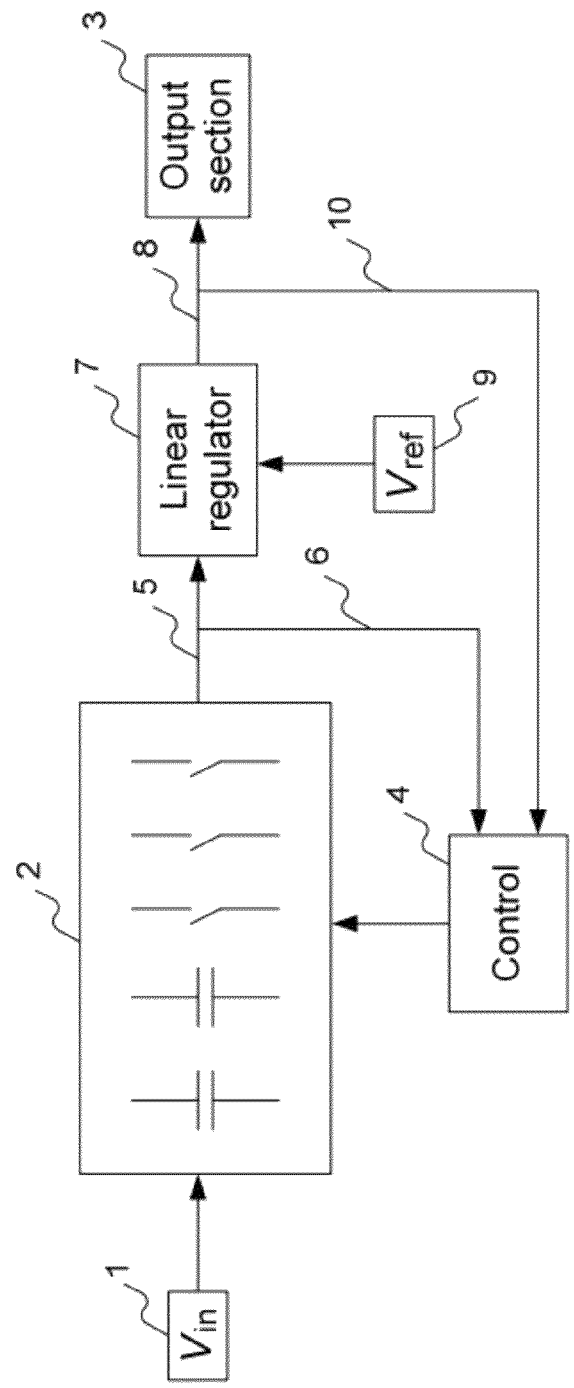
FIG. 13 demonstrates an improved resolution DC-DC converter based on a linear regulator, according to a feature of the present invention.
Figure 15:
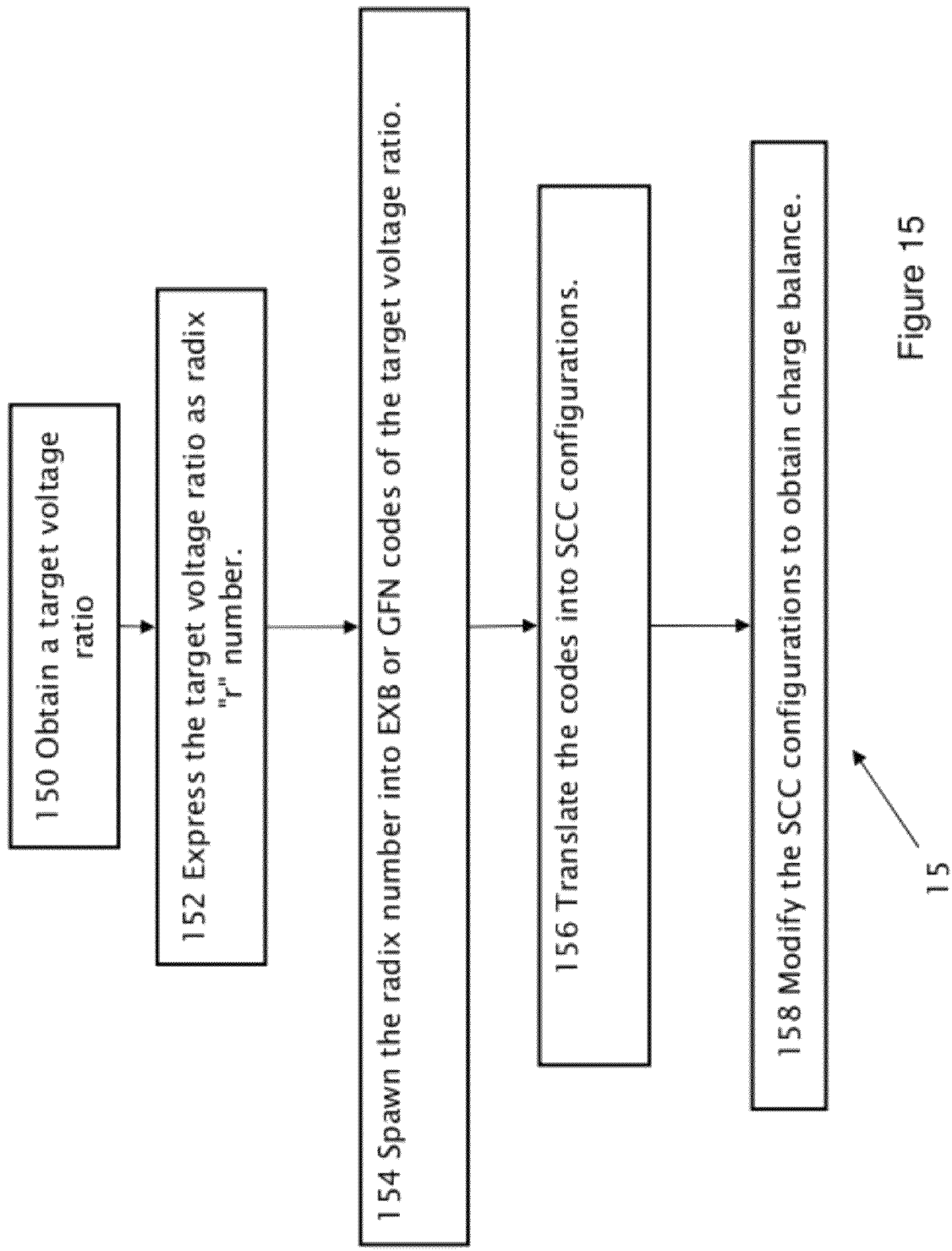
FIG. 15 shows a flow chart of a method to achieve switched capacitor converter (SCC) circuit configurations according to features of the present invention.

Reference is now made to FIGS. 15, 16a, 16b and 16c according to an embodiment of the present invention. FIG. 15 shows a method 15 to achieve switched capacitor converter (SCC) circuit configurations shown in FIGS. 16a, 16b and 16c. A desired target voltage represented as the ratio of the output voltage 5 to input voltage 1 shown in FIGS. 1, 11 and 13 is obtained (step 150), for example 3/5. The target voltage is then expressed as a radix r (E.g. r=5) number; 3/5= 3.51$^{-1}$={0 3} (step 152). The radix number r (r=5) is then spawned (step 154) to give for example; generic fractional numbers (GFN) codes {0 3} and {1 −2} or alternatively extended binary codes. The generic fractional numbers (GFN) {0 3} and {1 −2} are then translated (step 156) into switched capacitor converter (SCC) configurations shown in FIGS. 16a, 16b respectively. The switched capacitor converter (SCC) circuit configuration shown in FIG. 16b is modified (modification shown in FIG. 16c) for the purpose of obtaining charge balance (step 158).

The theoretical foundation of this invention can be applied in different embodiments of the present invention with numerous configurations of step down switched capacitor DC-DC converters that will have target resolutions that are limited only by the number of capacitors used (j). Furthermore SCC of an embodiment that follows this algorithm will have the target conversion ratios evenly spaced at a resolution of $2^{-j}$ when an EXB code is used or any desired resolution when the GFN code is used. Hence, a SCC build according to embodiments of the present invention exhibits multiple target conversion ratios and has therefore high efficiency over its full conversion range.

Referring back to FIG. 1, the general description a DC-DC converter, switch-capacitor assembly 2 includes j capacitors, (j depending on the required resolution) and switches to allow commutation from one EXB or GFN sequence to another. The function of the control block 4 is to change the state of the switches so as to follow the EXB and/or GFN sequence of a desired voltage target ratio.

Figure 9:
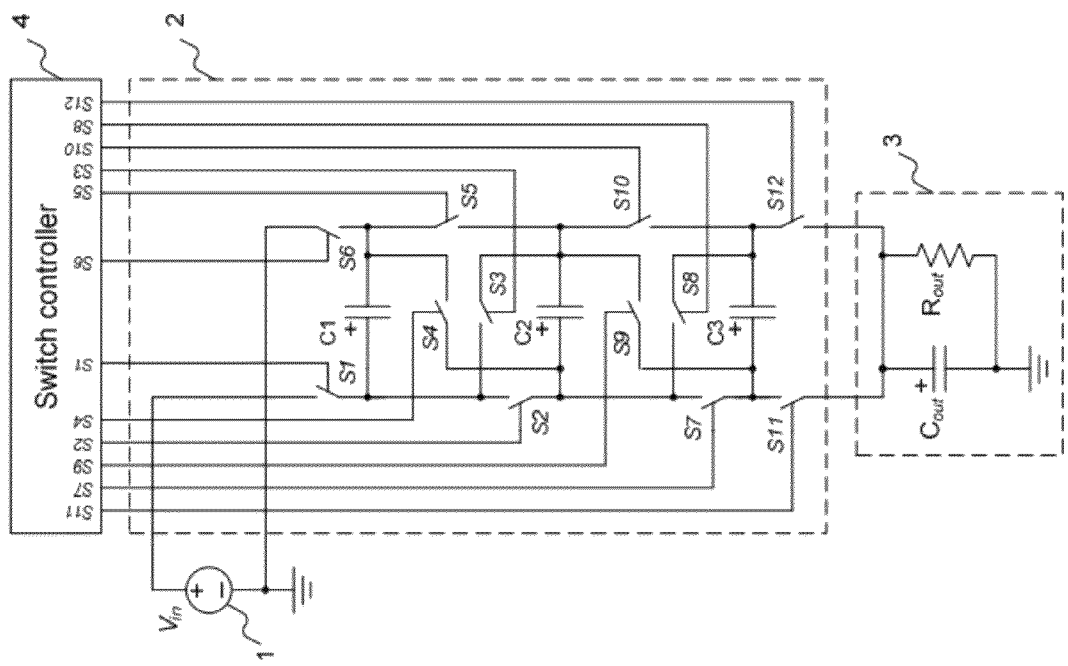
FIG. 9 illustrates a possible interconnection of switches and capacitors according to an embodiment of the present invention for j=3.
Figure 10B:
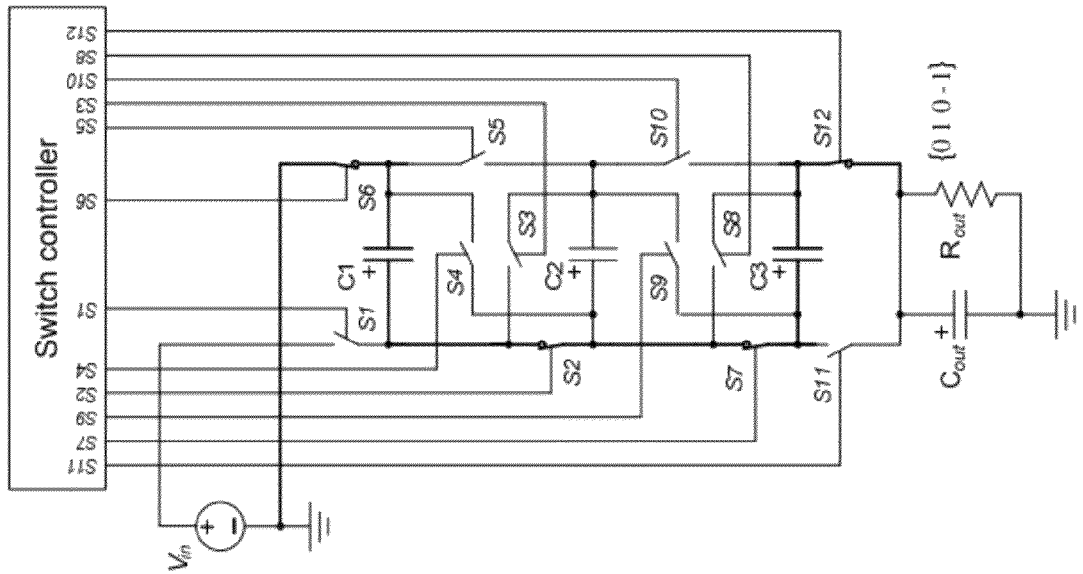
FIGS. 10(a)-10(e) depict interconnection of capacitors for all the EXB sequences of $N_j$=3/8.
Figure 10A:
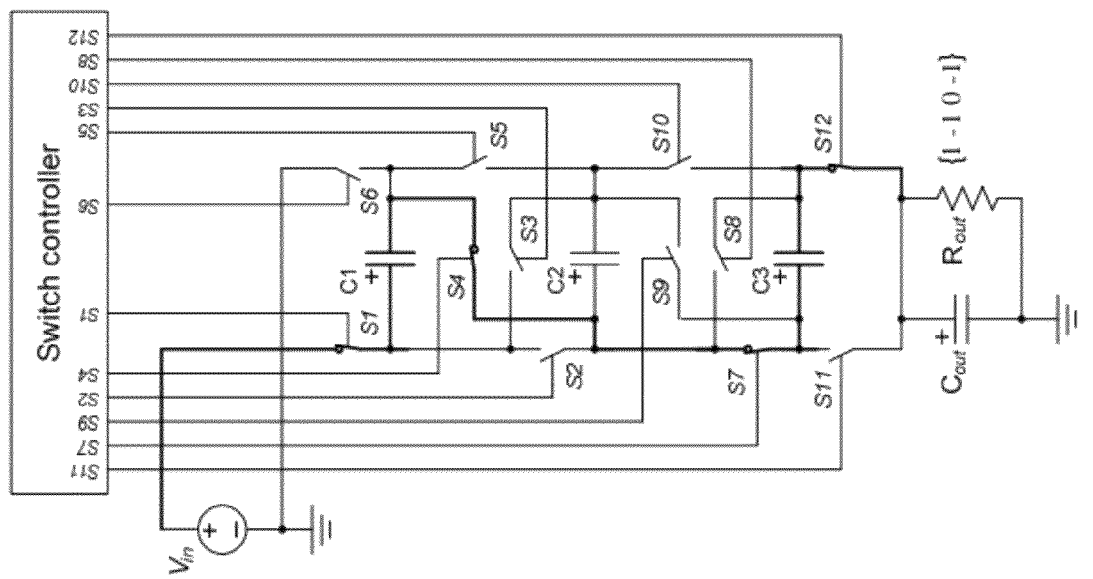
Figure 10D:
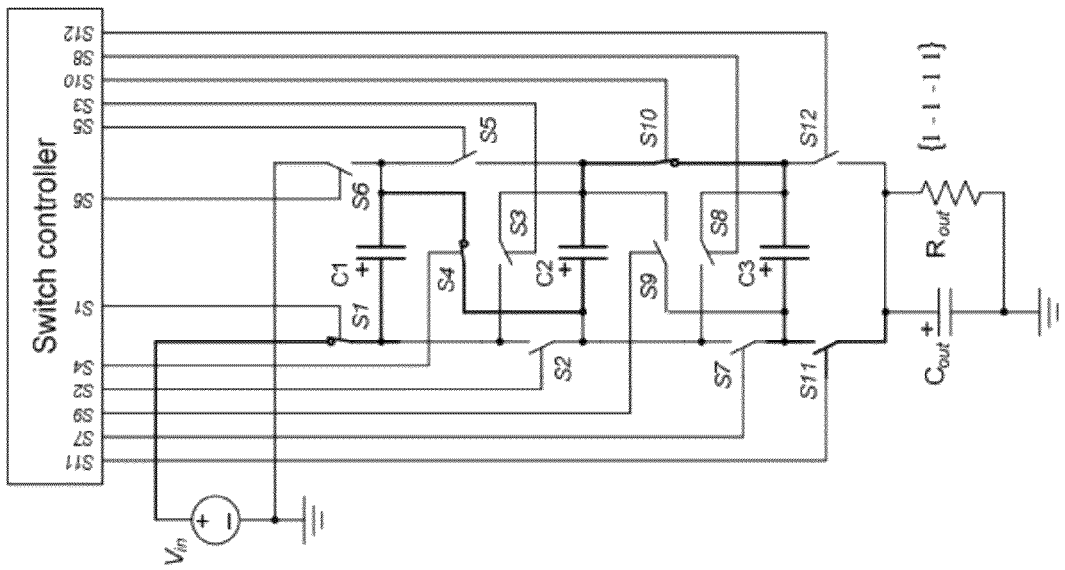
Figure 10C:
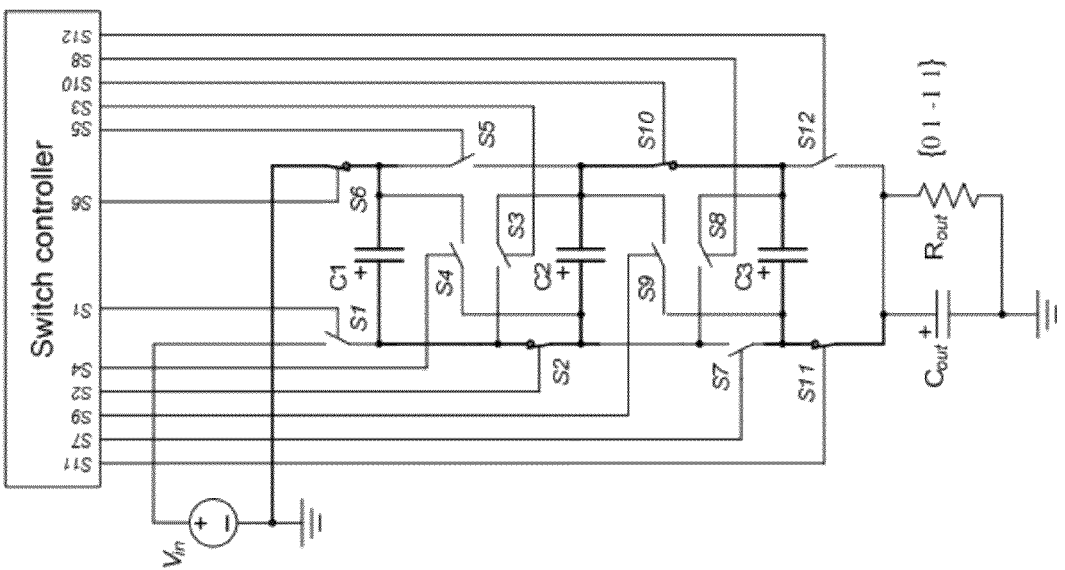
Figure 10E:
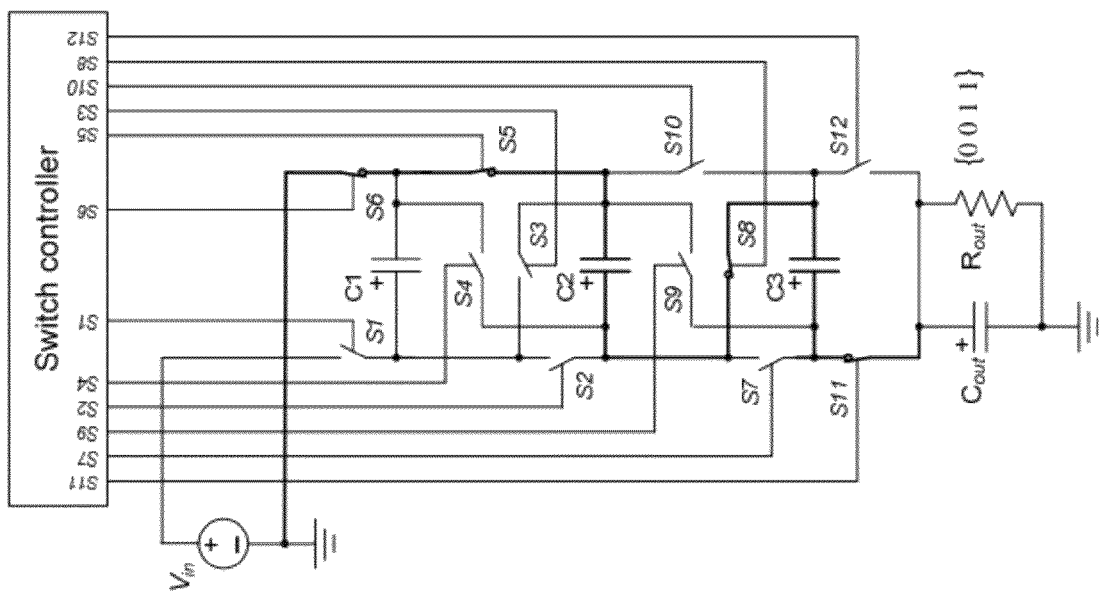

Reference is now made to FIG. 9, which illustrates an embodiment of according to the present invention for switch connections in the case of j=3. Switches $S_1$ to $S_{12}$ allow connections of each capacitor in series with output network 3 and input voltage 1 both in the charging and discharging polarities. By way of illustration, the realization of all the EXB sequences for $N_j=3/8$ are illustrated in FIGS. 10a-10e.

As would be clear to a person trained in the art, the conversion ratios predicted by equation (1) are theoretical since they do not account for inner circuit losses such as the resistance of the switches and the equivalent series resistance (ESR) of the capacitors. These and other parasitic effects may cause the output voltage to deviate from the ideal one $N_j$ when the DC-DC conversion system is loaded.

Reference is now made to FIG. 11 which illustrates, a feedback signal fed via line 6 from output voltage (line 5) to the control section 4. Feedback signal 6 is compared to an internal or external reference voltage $V_{ref}$ 9. When a difference between the output voltage and the required voltage is detected, the control 4 will change the EXB sequence so as to reduce the difference to within the resolution of the system ($V_{in}N_j$). In this embodiment the output voltage will be maintained at the required voltage $V_{ref}$ to within the inherent resolution of the system, $V_{in}2^{-j}$. If necessary, the resolution can be improved by dithering. That is, in order to obtain an output voltage value in between two discrete conversion ratios ($V_n m/2^j$ and $V_{in}(m+1)/2^j$; m=0 . . . ($2^j-1$)), the system can dither between the two EXB sequences ($V_n m/2^j$ and $V_n(m+1)/2^j$) in a duty cycle that is determined by the value of $V_{ref}$. Reference is now also made to FIG. 10 which demonstrates schematically a dither operation for the case of a $V_{ref}$ in between $V_{in}3/8$ and $V_{in}4/8$ with a dither period of 5 EXB sequences. In four of them $N_j=3/8$ and in one $N_j=4/8$. As would be clear to a person in the art, embodiments of the present invention that include dithering improves the resolution of the output voltage per the duty cycle between the two neighboring $N_j$ sequence or, in a more elaborate control, by dithering over several (more than two) $N_j$ sequences.

Figure 12:
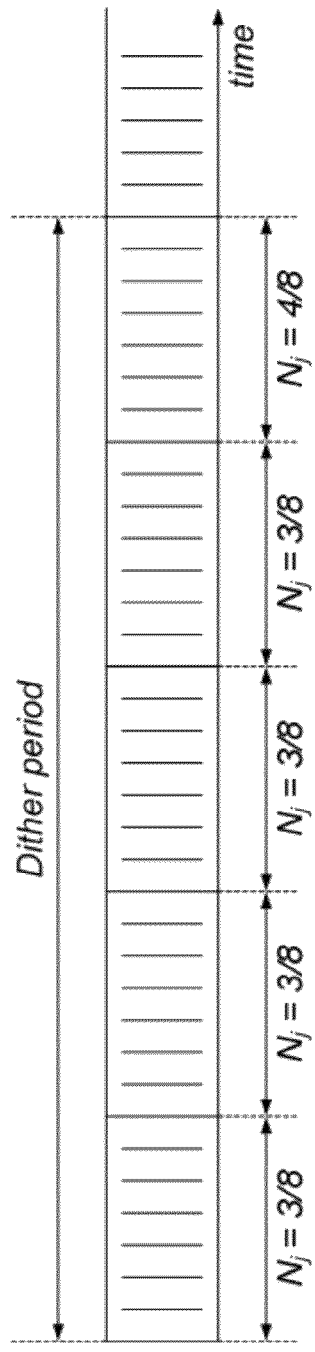
FIG. 12 shows schematically a dither sequence, according to a feature of the present invention.

Reference is now made to FIG. 13, a block diagram according to another feature of the present invention. If the use of dithering (FIGS. 11 and 12) causes higher output ripple for instance due to the lower effective frequency of operation, the output ripple can be overcome. In FIG. 13, the resolution is increased to infinity by the addition of a Low Drop Out (LDO) linear regulator 7 that is placed between the output of the switched capacitors and the output section. Losses are minimized by setting the $N_j$ such that the voltage drop across regulator 7 will always be the minimum value required for proper operation of the device.

Figure 14A:
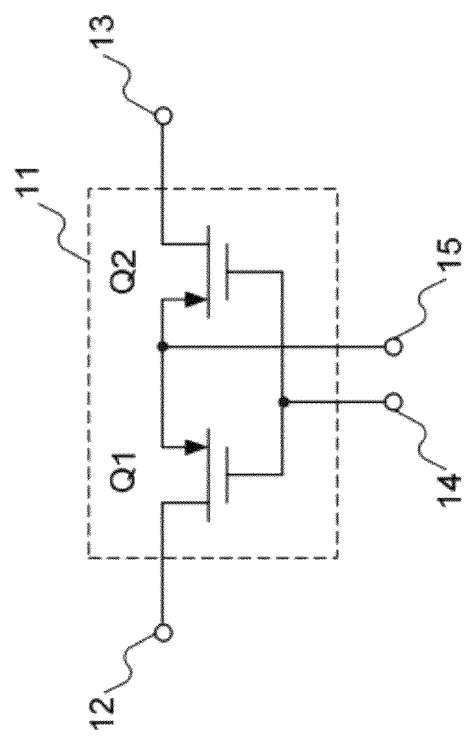
FIGS. 14(a) and 14(b) show possible microelectronic realization of bidirectional switches according to different aspects of the present invention, wherein FIG. 14a includes a series connection and FIG. 14b includes a parallel connection.
Figure 14B:
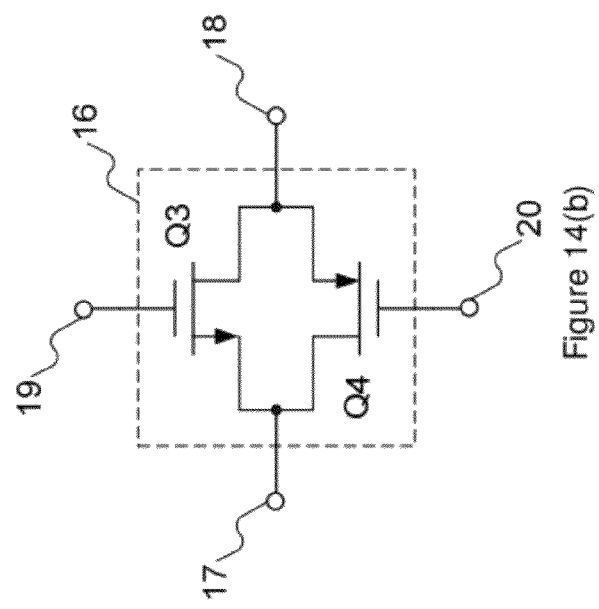

Reference is now made to FIG. 14 which illustrates yet another feature according to embodiments of the present invention. An important advantage of DC-DC converters is that they can be implemented wholly or partially by microelectronics technology, e.g. integrated circuits (IC). Among the possible realization of the required switches are the serially and parallel connected MOSFETs that perform as a bidirectional switch. In FIG. 14a two n channels MOSFETs (Q1, Q2) are connected in a back to back manner to form the switch 10 between terminals 12 and 13. The switch is controlled by a signal fed to the gate terminals 14, 15. The parallel connected realization (FIG. 14b), comprises an n channel Q4 and a p channel Q3 transistors and two control terminal 19 and 20 for each of the gates respectively.

The definite articles "a", "an" is used herein, such as "a converter", "a switch" have the meaning of "one or more" that is "one or more converters" or "one or more switches".

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A direct-current to direct current (DC-DC) converter adapted for converting an input voltage to an output voltage, the DC-DC converter comprising:
   a) a plurality of capacitors; and
   b) a plurality of switches connectible to at least a portion of said capacitors,
   wherein said capacitors are connected by said switches based on an extended binary representation of a target ratio of the input voltage to the output voltage of the DC-DC converter.

2. The DC-DC converter of claim 1, wherein, during operation of said converter, charge and discharge instances of said capacitors are balanced for a block switching cycle according to the extended binary representation and the charge and discharge instances of said capacitors follow each other.

3. The DC-DC converter of claim 1, wherein the output to input transfer ratio is less than 1.

4. The DC-DC converter of claim 1, wherein the output to input transfer ratio is greater than 1.

5. The DC-DC converter of claim 1, wherein, during operation of the DC-DC converter, the target ratio varies to a second target ratio and in response said switches are reconfigured based on a second extended binary representation of said second target ratio.

6. The DC-DC converter of claim 1, further comprising
   c) a switch controller configured for controlling said switches, wherein feedback between the output voltage to said switch controller stabilizes said output voltage for achieving said target ratio.

7. The DC-DC converter of claim 1, further comprising
   c) a switch controller configured for controlling said switches by dithering in time between at least two extended binary representations of at least two target ratios.

8. The DC-DC converter of claim 1, wherein said capacitors and said switches form a block of switched capacitors, the DC-DC converter further comprising:
   c) a linear regulator disposed between said block of switched capacitors and the output voltage.

9. A step-down DC-DC converter, comprising:
   a) a controller; and
   b) a capacitor-switch assembly including a plurality of capacitors and a plurality of switches, wherein said capacitor-switch assembly receives an input voltage, and outputs an output voltage, wherein said capacitor-switch assembly receives a sequence for connection of the capacitors via the switches so as to generate the output voltage $V_{out}$ being controlled by the controller according to an algorithm,
   wherein the controller controls the switches by dithering in time between at least two extended binary representations of at least two target ratios, said at least two target ratios including ratios of the input voltage and the output voltage, and wherein the capacitors and the switches form a block of switched capacitors and a linear regulator is disposed between the block of switched capacitors and the output voltage.

10. A direct-current to direct current (DC-DC) converter adapted for converting an input voltage to an output voltage, the DC-DC converter comprising:

a) a plurality of capacitors; and b) a plurality of switches connectible to at least a portion of said capacitors, wherein said capacitors are connected by said switches based on an Generic Fractional Numbers (GFN) representation of a target ratio of the input voltage to the output voltage of the DC-DC converter.

11. The DC-DC converter of claim 10, wherein, during operation of said converter, charge and discharge instances of said capacitors are balanced for a block switching cycle according to the Generic Fractional Numbers (GFN) representation and the charge and discharge instances of said capacitors follow each other.

12. The DC-DC converter of claim 10, wherein the output to input transfer ratio is smaller than 1.

13. The DC-DC converter of claim 10, wherein the output to input transfer ratio is larger than 1.

14. The DC-DC converter of claim 10, wherein, during operation of the DC-DC converter, the target ratio varies to a second target ratio and in response said switches are reconfigured based on a second Generic Fractional Numbers (GFN) representation of said second target ratio.

15. A method of constructing a direct-current to direct current (DC-DC) converter from an input voltage to an output voltage, the DC-DC converter having a plurality of capacitors and a plurality of switches connectible to at least a portion of said capacitors, the method comprising:

obtaining a target voltage ratio based on said input voltage and said output voltage;

expressing said target voltage ratio as a radix number;

spawning said radix number into a code of said target voltage ratio; and translating said code into a switched-capacitor converter (SCC) configuration including said switches and said capacitors.

16. The method of claim 15, wherein said code is an extended binary representation code.

17. The method of claim 15, wherein said code is a Generic Fractional Numbers code.

18. The method of claim 15 further comprising modifying said switched-capacitor converter (SCC) configuration to obtain charge balance.

* * * * *